United States Patent [19]

Hanauye et al.

[11] 4,179,429

[45] Dec. 18, 1979

[54] LAMINATES PREPARED FROM RESOL-TYPE PHENOL RESINS

[75] Inventors: Kunio Hanauye; Tsutomu Takase; Yoshio Morimoto, all of Nagoya, Japan

[73] Assignee: Mitsui Toatsu Chemicals Incorporated, Tokyo, Japan

[21] Appl. No.: 871,072

[22] Filed: Jan. 19, 1978

Related U.S. Application Data

[63] Continuation-in-part of Ser. No. 732,917, Oct. 15, 1976, abandoned.

[30] Foreign Application Priority Data

Oct. 22, 1975 [JP] Japan .................... 50-126281

[51] Int. Cl.² .................... C08G 8/20; C08G 8/24; B32B 27/42
[52] U.S. Cl. .................... 260/32.8 R; 260/33.4 R; 260/33.6 R; 428/460; 428/524; 428/531; 528/152; 528/153
[58] Field of Search .......... 260/51 R, 53 R, 32.8 R, 260/33.4 R, 33.6 R; 528/152; 428/460, 524, 531

[56] References Cited

U.S. PATENT DOCUMENTS

| | | | |
|---|---|---|---|
| 2,006,043 | 6/1935 | Dykstra | 260/53 X |
| 2,587,578 | 3/1952 | Jones | 260/51 X |
| 2,907,751 | 10/1959 | Christenson et al. | 260/53 |
| 3,294,746 | 12/1966 | Farnham | 528/152 X |
| 3,758,597 | 9/1973 | Buysch et al. | 260/51 X |

FOREIGN PATENT DOCUMENTS

2647321 5/1977 Fed. Rep. of Germany.
52-60894 5/1977 Japan.

OTHER PUBLICATIONS

Chem. Abstracts. vol. 71, 1969, 22525t, Ismailov et al.

*Primary Examiner*—Howard E. Schain

[57] ABSTRACT

A new resol-type phenol resin is described which is obtained by heat-reacting isopropenylphenol oligomer as partial or whole phenol component of the resin with an aldehyde in the presence of a basic catalyst. Varnishes are obtained by adding a suitable vehicle to the resin. Laminates manufactured by impregnating a base with the phenol resin and heating the impregnated base to cure the resin are obtained with superior mechanical and electrical characteristics.

4 Claims, No Drawings

LAMINATES PREPARED FROM RESOL-TYPE PHENOL RESINS

This application is a continuation-in-part of Ser. No. 732,917, filed Oct. 15, 1976, and now abandoned.

BACKGROUND OF THE INVENTION

1. Field of the Invention

The present invention relates to new phenol resins containing isopropenylphenol oligomer as partial or whole phenol component of the resin and an aldehyde. The invention further relates to varnishes containing the new resin and to laminates having superior mechanical and electrical properties and impregnated with the resins.

2. Description of the Prior Art

Present-day laminates are manufactured by impregnating a base such as paper or the like with a phenol resin prepared by reacting such substances as phenols, cresols or alkylphenols with formaldehyde and curing the resin. These laminates are widely used as decorative panels or as heat-resisting or electrically insulating materials. In recent years, laminates possessing high mechanical and electrical properties are in particular demand because of the vastly emerging development in telecommunications and electronic instruments. Especially, the commonly used copper-clad laminates are required not only to possess a high degree of electrically insulating ability but also to be satisfactory in many other properties such as punching quality, surface resistivity, volume resistivity, soldering heat resistance, dimensional stability, dielectric constant, dielectric tangent, and water-absorption. For example, a phenol resin containing as the phenol component thereof an alkylphenol such as cresol, propylphenol, butylphenol, octylphenol or nonlyphenol is widely used for improving punching quality. A drying oil such as linseed oil, tung oil or cashewnut oil is used as a plasticizer in this case. However, the use of such plasticizer for improving punching quality has a demerit in that other useful and/or necessary physical properties of the resin are thereby worsened, such as for example insulation resistance, especially insulation resistance after boiling.

SUMMARY OF THE INVENTION

It is therefore an object of the present invention to provide resol-type phenol resins which can afford laminates possessing improved electrical and mechanical characteristics.

It is another object of the invention to provide a varnish which contains the phenol resins of the invention and is suitable for laminates having superior mechanical and electrical properties. It is yet another object of the invention to provide laminates which contain the phenol resins of the invention and possess superior mechanical and electrical characteristics.

Briefly stated, the resin of the present invention is a resol-type phenol resin prepared by heat-reacting isopropenylphenol oligomer of the general formula selected from

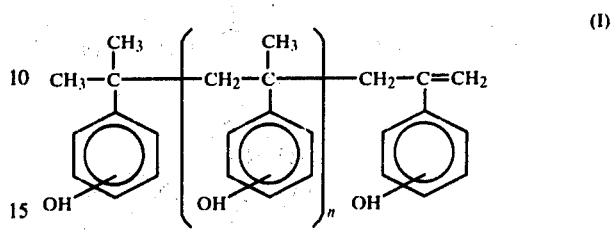

and

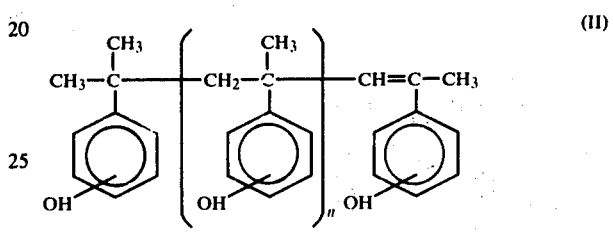

wherein n stands for an integer of from 0 to 18, as the partial or whole phenol component of the resin with an aldehyde in the presence of a basic catalyst.

In the general formulas (I) and (II), each hydroxyl group may be present in any of the ortho-, meta- and para-positions of the benzene ring. Monomers, dimers and trimers of isopropenylphenol may be synthesized as pure compounds. However, a tetramer or higher oligomer is present in the form of a mixture. A similar result is achieved whether the dimer or trimer of isopropenylphenol is used alone or in admixture with such or higher oligomers.

The novel resol-type isopropenylphenol oligomer resin according to the present invention surprisingly exhibits excellent properties superior to those of conventional resol-type phenol resins and resol-type isopropenylphenol resin. For example, the laminate made of said resin shows markedly improved properties such as warp, dimensional change rate and flatwise dielectric breakdown voltage.

Such a fact is entirely unpredictable from the properties and characteristics of heretofore known resol-type isopropenylphenol resins, presumably this striking phenomenon being caused by the following reasons:

1. The structural difference between resol-type isopropenylphenol resin and resol-type isopropenylphenol oligomer resin;

The reaction products obtained by reacting isopropenylphenol monomer and dimer with formalin in the presence of a basic catalyst can be expressed by the formulas (III) and (IV), or (V) below.

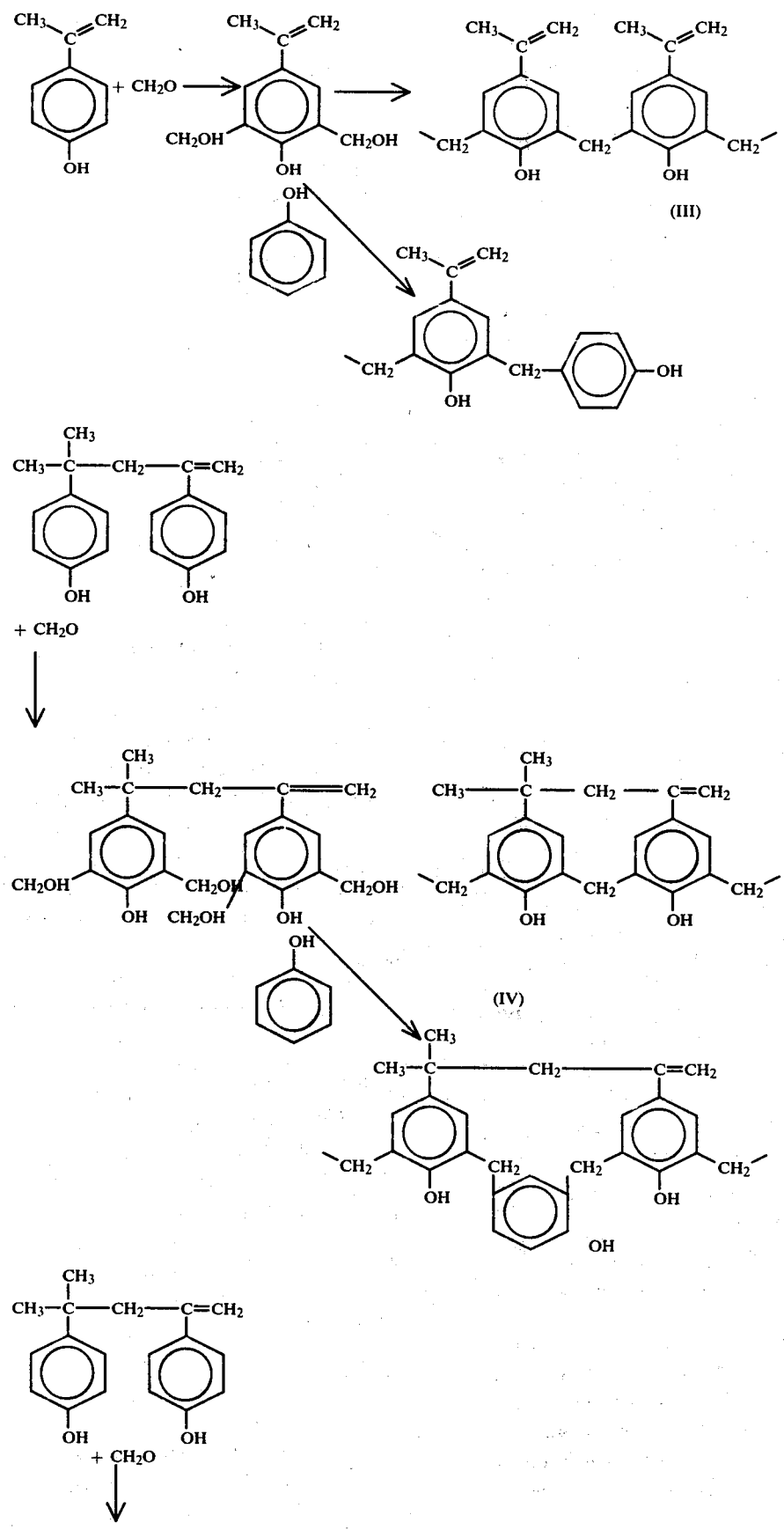

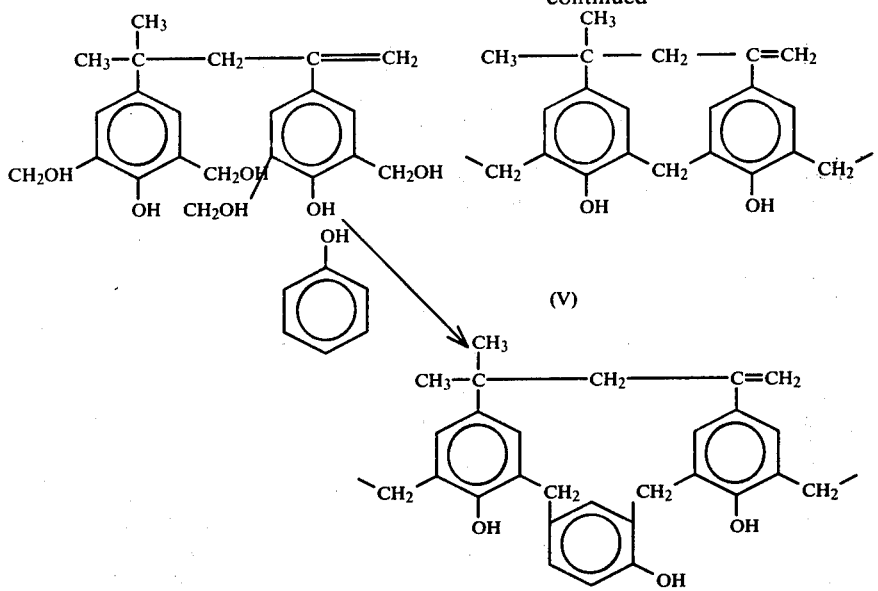

(V)

The products according to the formulas (IV) and (V) exhibit higher crosslinking property than that of the product of formula (III). Consequently, the resins obtained upon curing the former products are extremely stable. Hence, the novel resol-type isopropenylphenol oligomer resin shows, when it is shaped into a laminate, improved dimensional change rate and warp due to the high stability, and also the excellent flatwise dielectric breakdown voltage due to the increased interlayer bonding strength.

2. The isopropenylphenol oligomer shows higher reactivity with formalin compared with the monomer, such as 2~2.5 times, which results in the decrease of unreacted phenol component in the resin. This is advantageous to the curing of resin, and the laminate prepared from the resin exhibits such characteristics unseen or unpredictable with the phenol resins prepared from isopropenylphenol monomer, such as the improved warp, dimensional change rate and flatwise dielectric breakdown voltage.

3. As can be understood from the structural formula, with isopropenylphenol the reaction with formaldehyde takes place difunctionally at 2,6 positions of the benzene ring. Whereas, with the dimer the active positions are four, and with the trimer, six. In the phenol resin, the curing by crosslinking does not take place with difunctional phenol. On the other hand, it is only logical that the crosslinking easily takes place with the dimer and higher oligomers, in the light of the theory of gelation. Therefore, different properties as a thermosetting resin can be expected between that made from the monomer and that from the oligomer.

DESCRIPTION OF THE PREFERRED EMBODIMENTS:

The most typical methods for the preparation of isopropenylphenol monomer and oligomer are the following three:

(1) Diphenylolpropane is cleft in the presence of an acidic or alkaline catalyst.

Upon the cleavage, propenylphenol and an oligomer thereof can be obtained. The p-isopropenylphenol can be further converted into the dimer, trimer, or mixtures of those with higher oligomers. When diphenylolpropane is used as the starting material, the p,p'-substituted compound which is normally referred to as Bisphenol A, is most frequently used, but the p,o'-substituted compound existing as an isomer may also be used with equivalent results. The phenol by-produced by the decomposition may be removed, or may be left as a component in the mixture.

(2) When diisopropylbenzene is oxidized and further decomposed to produce hydroquinone or resorcinol, m- or p-isopropenylphenol can be obtained as the by-product.

In the preparation of hydroquinone or resorcinol using diisopropylbenzene as the starting material, m- or p-isopropenylphenol are produced as side-reaction products, which can be easily converted to the dimer or mixtures of the dimer and other oligomers.

(3) Isopropenylphenol oligomer may also be obtained by the process for dehydrogenating propenylphenol in a form of o-, m-, or p-isomer alone or a mixture thereof. Generally, in the process of propylizing phenols with propylene, propenylphenol is obtained as a mixture of isomers and isopropenylphenol dimer or a mixture of the dimer with other oligomers may be produced from the propenylphenol. One embodiment of converting isopropenylphenol monomer to the oligomer will be explained hereinbelow.

Isopropenylphenol is heated for an hour at 125° C., and cooled to 115°~120° C. under stirring. The product is gradually solidified into a yellow mass. The solid is dissolved in toluene and recrystallized according to the accepted practices, to form white crystals. The typical yield is 70%. The crystals are the dimer which can be expressed by the formula below:

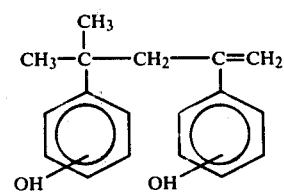

Alternatively, iso-propenylphenol is dissolved into 50% acetic acid and the resulting solution is maintained at pH=1 by adding 37% hydrochloric acid in a catalytic amount.

After stirring the solution for 18 hours at 25° C., white crystals are precipitated. The crystals are recrystalized with methanol-water. Crystals thus obtained are a trimer represented by the following formula:

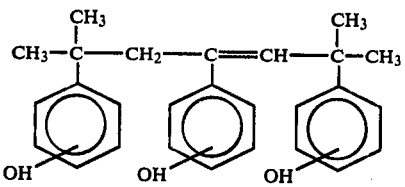

According to the present invention, the intended effect can be obtained by using the isopropenylphenol oligomer as the sole phenolic component of the resin, to accomplish the preparation of the laminate exhibiting excellent warp, dimensional change rate and flatwise dielectric breakdown voltage. Whereas, it is also permissible to use the isopropenylphenol oligomer concurrently with other phenolic compounds to serve as the phenolic component of the resin.

Examples of other useful phenolic compounds include heretofore known phenols; alkylphenols containing alkyl groups of $C_1 \sim C_{20}$ such as cresols, xylenols, ethylphenols, propylphenols, butylphenols, amylphenols, octylphenols, nonylphenols and dodecylphenols; other phenolic compounds having the structures analogous to the alkylphenols such as Bisphenol A, phenylphenols, cumylphenols and styrenated phenols; and polyhydric phenols such as catechol and resorcinol.

Besides the phenolic compounds, polyglycolic substances, drying oils having unsaturated bonds such as tung oil, cashewnut oil and linseed oil, rosin, resol-type or novolac-type precondensation products obtained upon reacting phenols with aldehydes, as well as the optional mixtures of the foregoing, may also be used concurrently.

In such concurrent use of other phenolic components, it is preferred that the isopropenylphenol oligomer represent $2 \sim 60\%$ of the total phenolic component.

As the aldehyde component useful for the present invention, aqueous formaldehyde solution, paraformaldehyde and other compounds which release formaldehyde when heated, may be named.

In order to make the resol-type phenol resin according to the present invention, basic catalysts such as caustic alkali, ammonia and amines can be used. Those catalysts may be used either singly or as mixtures. The catalyst is normally used within the range of $0.1 \sim 3\%$ of the starting material or materials serving as the phenolic component. The reaction can be effected in the concurrent presence of water or an organic solvent such as an aliphatic alcohol, acetone or dioxane.

The reaction temperature is usually within the range of $50° \sim 100°$ C., and the reaction time $1 \sim 15$ hours, inter alia, $2 \sim 6$ hours.

The molar ratio of the aldehyde component to the phenolic component may range from 0.3 to 1.5, normally from 0.7 to 1.4. After completion of the reaction, the catalyst is neutralized if necessary, and thereafter the water or organic solvent is distilled off under reduced pressure. Thus, the resol-type phenol resin of the present invention is obtained.

The varnish of the resol-type resin is formed by adding a suitable solvent such as an alcohol, ketone or an aromatic hydrocarbon to the phenol resin. Normally, the concentration of the solvent in the varnish ranges from 20 to 90% by weight.

A laminate from the resol-type resin is manufactured through the steps of, for example, impregnating a suitable base such as paper, fabric, asbestos or glass fiber, with the varnish, drying the base, making the base into the laminate material of a predetermined structure, and subjecting same to elevated temperatures and pressures. The suitable resin content of the laminate is $25 \sim 60\%$ by weight, preferably $30 \sim 50\%$ by weight.

Hereinafter, the process of this invention will be explained with reference to the working examples and controls.

EXAMPLE 1

A reaction vessel was charged with 94 g of phenol, 70 g of nonylphenol, 49 g of a p-isopropenylphenol dimer of the structures below (a mixture of 90% of pentene-1 type and 10% of pentene-2 type)

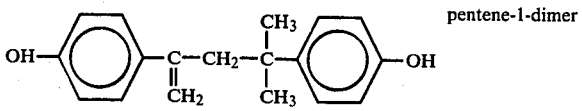
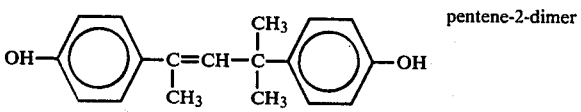

174 g of 37% formalin and 6.4 g of 28% aqueous ammonia solution. The reaction was effected at 95° C. for 5 hours under stirring. Thereafter, the reaction mixture was dehydrated under reduced pressure, which was stopped when the inside temperature of the vessel fell to 90° C. The mixture was then cooled, and converted to a varnish having a resin content of 40%, by the addition of methanol. A sheet of cotton linter paper was impregnated with the varnish, and dried to provide a base containing 45% by weight of the resin. Ten sheets of such a base, and a sheet of copper foil with an adhesive-applied surface were superposed one upon the other, and pressed for 50 minutes at 160° C., under a pressure of 100 kg/cm². Thus, a copper-clad laminate of 1.5 mm in thickness was obtained. The physical properties of the laminate are shown in Table 1.

EXAMPLE 2

Example 1 was repeated except that the starting phenolic components were charged to 94 g of phenol, 70 g of nonylphenol and 49 g of a mixture of p-isopropenylphenol and the oligomers thereof (containing, in terms of molecular weight distribution, 5% monomer, 70% dimer, 10% trimer, and 15% tetramer and higher oligomers).

The physical properties of the resulting laminate are shown in Table 1.

EXAMPLE 3

Using 94 g of phenol, 70 g of nonylpheol, 6.0 g of p-isopropenylphenol dimer of the same composition to that used in Example 2, 140.3 g of 37% formalin, and 5.1 g of 28% aqueous ammonia solution, the reaction, post-treatments and preparation of the copper-clad laminate were effected as described in Example 1. The physical properties of the resulting laminate are shown in Table 1.

Control 1

A reaction vessel was charged with 94 g of phenol, 70 g of nonylphenol, 137 g of 37% formalin and 5 g of 28% aqueous ammonia. The reaction was effected at 95° C. for 5 hours under stirring. Thereafter, the reaction mixture was dehydrated under a reduced pressure, which was stopped when the inside temperature of the vessel fell to 90° C. The mixture was then cooled and methanol was added to form a varnish of which resin content was 40%. A sheet of cotton linter paper was impregnated with the varnish and dried to provide a base containing 45% by weight of the resin. Ten sheets of the same base and a sheet of copper foil with an adhesive-applied surface were superposed one upon the other and pressed for 50 minutes at 160° C. under a pressure of 100 kg/cm$^2$. Thus, a copper-clad laminate of 1.5 mm in thickness was obtained. The physical properties of the laminate are shown in Table 1.

Control 2

A reaction vessel was charged with 94 g of phenol, 70 g of nonylphenol, 49 g of p-isopropenylphenol, 174 g of 37% formaline and 6.4 g of 28% aqueous ammonia solution. The reaction was effected at 95° C. for 5 hours under stirring. After completion of the reaction, the reaction mixture was dehydrated under reduced pressure, which was stopped when the inside temperature of the vessel fell to 90° C. The mixture was then cooled and methanol was added to form a varnish with a resin content of 40%. The varnish was used in the manufacture of the copper-clad laminate by the means described in Control 1. The physical properties of the laminate are shown in Table 1.

Control 3

A reaction vessel was charged with 94 g of phenol, 70 g of nonylphenol, 18 g of p-isopropenylphenol and 31 g of o-isopropenylphenol, 174 g of 37% formalin and 6.4 g of 28% aqueous ammonia solution. The reaction was effected at 95° C. for 5 hours under stirring, and the resulting reaction mixture was dehydrated under reduced pressure. The dehydration was stopped when the inside temperature of the vessel fell to 90° C., and the mixture was cooled and methanol was added to form a varnish containing 40% of the resin. The varnish was used in the preparation of a copper-clad laminate in the manner described in Control 1.

The physical properties of the laminate are shown in Table 1.

Control 4

The reaction, post-treatments and the preparation of a copper-clad laminate were effected in the manner described in Control 1, except that 94 g of phenol, 70 g of nonylphenol and 50 g of a p-isopropylphenol-p-isopropenylphenol mixture (the blend ratio of p-isopropylphenol to p-isopropenylphenol was 25% to 75%) were used as the phenolic component.

The physical properties of the resulting laminate are shown in Table 1.

Testing methods (1) The insulation resistance, volume resistivity, surface resistivity, dielectric constant, water absorption ratio and soldering heat resistance were determined according to the procedures of JIS C-6481. (Japan Industrial Standard)

(2) The punching quality was tested in accordance with ASTM D-617-44.

(3) The dimensional change rate was determined as follows:

A test piece of 140 mm (length)×13 mm (width) in size was left in a thermostat (100°±1° C.) for 24 hours and then withdrawn. Cooling the piece to room temperature, its dimensional change rate (%) was calculated by the equation below.

Five test pieces were prepared from each run and the average value of the five test results was used as the dimensional change rate of the particular sample.

Dimensional change rate = $(a-b)/a \times 100$ a: length of the test piece before heating
b: length of the test piece after heating (4) Warp:

A test piece of 140 mm (length)×13 mm (width) in size was heated in a thermostat (100°±1° C.) for 24 hours and then cooled to room temperature. A straight ruler was laid on the concave parts of the laminate and the greatest clearance (h mm) as illustrated below was used as the warp of the sample.

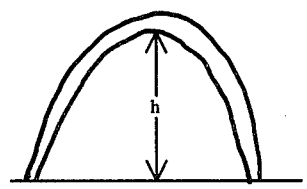

Table 1

| Test Items and Testing Conditions | Samples | | Examples | | | Controls | | | |
|---|---|---|---|---|---|---|---|---|---|
| | | | 1 | 2 | 3 | 1 | 2 | 3 | 4 |
| Insulation resistance ($\Omega$) | Normal State | C-90/20/65 | $4.5 \times 10^{12}$ | $4.3 \times 10^{12}$ | $9.8 \times 10^{11}$ | $10^9 \sim 10^{10}$ | $5.8 \times 10^{12}$ | $5.3 \times 10^{12}$ | $7.3 \times 10^{12}$ |
| | After boiling | C-90/20/65 +D-2/100 | $3.5 \times 10^8$ | $5.4 \times 10^8$ | $5.6 \times 10^8$ | $10^6 \sim 10^7$ | $2.0 \times 10^9$ | $2. \times 10^9$ | $4.8 \times 10^9$ |
| Punching quality | 70° C. | | 80–90 | 80–90 | 80–90 | 20–30 | 80–90 | 80–90 | 80–90 |
| Volume resistivity ($\Omega$ cm) | Normal State | C-90/20/65 | $5.8 \times 10^{12}$ | $3.2 \times 10^{12}$ | $4.6 \times 10^{12}$ | $10^{10} \sim 10^{11}$ | $4.3 \times 10^{12}$ | $3.9 \times 10^{12}$ | $4.2 \times 10^{12}$ |
| | After moisture absorbing treatment | C-90/20/65 +C-96/40/90 | $3.6 \times 10^{11}$ | $4.1 \times 10^{11}$ | $3.5 \times 10^{11}$ | $10^9 \sim 10^{10}$ | $5.2 \times 10^{11}$ | $5.6 \times 10^{11}$ | $2.1 \times 10^{11}$ |
| Surface | Normal State | C-90/20/65 | $8.0 \times 10^{12}$ | $5.9 \times 10^{12}$ | $5.8 \times 10^{12}$ | $10^{10} \sim 10^{11}$ | $6.2 \times 10^{12}$ | $8.1 \times 10^{12}$ | $5.4 \times 10^{12}$ |

Table 1-continued

| Test Items and Testing Conditions | Samples | | Examples 1 | 2 | 3 | Controls 1 | 2 | 3 | 4 |
|---|---|---|---|---|---|---|---|---|---|
| resistivity ($\Omega$) | After moisture absorbing treatment | C-90/20/65 +C-96/40/90 | $6.7 \times 10^{11}$ | $5.1 \times 10^{11}$ | $4.3 \times 10^{11}$ | $10^9 \sim 10^{10}$ | $4.8 \times 10^{11}$ | $6.9 \times 10^{11}$ | $4.2 \times 10^{11}$ |
| Dielectric constant $1 \times 10^6$ Hz) | Normal State | C-90/20/65 | 4.1 | 4.8 | 4.5 | $4.0 \sim 5.0$ | 4.2 | 4.3 | 4.2 |
| | After moisture absorbing treatment | C-90/20/65 +D-48/50 | 5.2 | 5.9 | 5.6 | $7.0 \sim 8.0$ | 4.8 | 4.8 | 5.2 |
| Water absorption ratio (%) | | E-24/50 +D-24/23 | 0.8 | 0.7 | 0.6 | $1.2 \sim 2.0$ | 0.9 | 0.6 | 0.6 |
| Dimensional change rate (%) | Lengthwise | | 0.12 | 0.10 | 0.18 | 0.69 | 0.39 | 0.51 | 0.41 |
| | Crosswise | | 0.16 | 0.12 | 0.28 | 0.78 | 0.47 | 0.80 | 0.52 |
| Warp (%) | Lengthwise | | 0.10 | 0.13 | 0.15 | 0.67 | 0.57 | 0.69 | 0.42 |
| | Crosswise | | 0.16 | 0.22 | 0.18 | 0.95 | 0.90 | 0.79 | 0.60 |
| Flatwise dielectric breakdown voltage (kv/mm) | Original State | | 41.5 | 42.3 | 40.3 | 30.5 | 32.4 | 29.0 | 1.7 |

What we claim is:

1. A laminate prepared from the product of a basic-catalyst-catalyzed reaction of, based on the total weight of the phenol components of said a resol-type phenol resin, 2-60% of a dimer of isopropenyl phenol of the formula selected from:

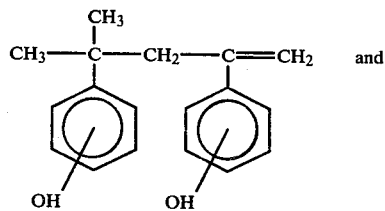 and 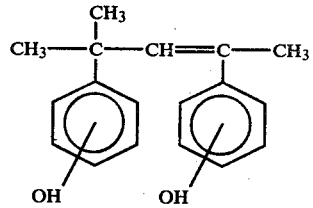

and 40-98% of other phenolic compounds selected from the group consisting of phenol, alkyl phenols having from 1 to 20 carbon atoms in the alkyl group, bisphenol-A, phenylphenols, cumyl phenol, styrenated phenols, catechol and resorcinol with formaldehyde.

2. The laminate according to claim 1, wherein said resol-type phenol resin further includes a vehicle selected from alcohols, ketones and aromatic hydrocarbons in amount of from 20 to 90% by weight.

3. The laminate according to claim 1, wherein said resol-type phenol resin reaction product is made from formaldehyde, isopropenyl phenol dimer, phenol and nonylphenol.

4. A laminate consisting of a plurality of superposed bases impregnated with said resol-type phenol resin of claim 1.

* * * * *